United States Patent [19]

Clement et al.

[11] Patent Number: 5,137,850

[45] Date of Patent: Aug. 11, 1992

[54] OPTICAL GLASS OF NEGATIVE ANOMALOUS PARTIAL DISPERSION IN THE BLUE REGION

[75] Inventors: Marc Clement; Volkmar Geiler, both of Mainz; Danuta Grabowski, Taunusstein, all of Fed. Rep. of Germany

[73] Assignee: Schott Glaswerke, Mainz, Fed. Rep. of Germany

[21] Appl. No.: 641,751

[22] Filed: Jan. 16, 1991

[30] Foreign Application Priority Data

Jan. 16, 1990 [DE] Fed. Rep. of Germany ....... 4001008
Oct. 13, 1990 [DE] Fed. Rep. of Germany ....... 4032567

[51] Int. Cl.$^5$ .................. C03C 3/072; C03C 3/074; C03C 3/155; C03C 4/00

[52] U.S. Cl. .......................... 501/51; 501/75; 501/76; 501/901; 501/903

[58] Field of Search .............. 501/903, 75, 76, 901, 501/51

[56] References Cited

U.S. PATENT DOCUMENTS 3,929,495 12/1975 Broemer et al. ............ 501/903
3,958,999 5/1976 Izumitani et al. ............ 501/75

*Primary Examiner*—Mark L. Bell
*Attorney, Agent, or Firm*—Millen, White & Zelano

[57] ABSTRACT

A chemically resistant glass which can be produced at relatively low melting temperatures and has anomalous negative partial dispersion $P_{g,F}$, a refractive index $n_d$ of from 1.73 to 1.83 and an Abbe coefficient $v_d$ of from 31 to 38 preferably contains (in % by weight, based on oxides):

| | | | | | |
|---|---|---|---|---|---|
| 0–4 | $SiO_2 + GeO_2$ | 0–2 | $GeO_2$ | 0–10 | MgO |
| 26–33 | $B_2O_3$ | 0–1 | $Li_2O$ | 0–16 | CaO |
| 19–50 | PbO | 0–1 | $Na_2O$ | 0–16 | BaO |
| 1–6 | $ZrO_2$ | 0–1 | $K_2O$ | 0–16 | SrO |
| 4–16 | $Ta_2O_5$ | 0–2 | Σ alkaline earth | | |
| 0–6 | $Al_2O_3$ | | metal oxides | 0–16 | ZnO |
| 0–4 | $TiO_2$ | 1.5–20 | Σ alkaline earth metal oxides + ZnO | | |
| 0–1 | $WO_3$ | 0–11 | $La_2O_3$ | | |
| 0–7 | $Nb_2O_5$ | 0–5.5 | $Y_2O_3$ | | |
| | | 0–5.5 | $Gd_2O_3$ | | |
| | | 4–11 | Σ $La_2O_3 + Y_2O_3 + Gd_2O_3$ | | | with the proviso that the $\Sigma(SiO_2+GeO_2+B_2O_3)/\Sigma(ta_2O_5+ZrO_2+HfO_2)$ ratio is less than 5 and the $PbO/\Sigma(SiO_2+GeO_2+B_2O_3)$ ratio is less than 1.7, and, if desired, conventional refining assistants.

3 Claims, No Drawings

OPTICAL GLASS OF NEGATIVE ANOMALOUS PARTIAL DISPERSION IN THE BLUE REGION

BACKGROUND OF THE INVENTION

This invention relates to an optical glass having a negative anomalous partial dispersion in the blue region of the spectrum, a refractive index $n_d$ of from 1.73 to 1.83, and an Abbe coefficient $v_d$ of from 31 to 38.

Manufacturers of optical lens systems have for years demanded glasses with which the secondary spectrum of the systems can be greatly suppressed. In particular, it is becoming increasingly desirable to effect correction in the blue region of the visible spectrum. In this region of the spectrum, the relative partial dispersion $P_{g,F}$ characterizes the optical behavior of the glass.

The dependence of the refractive index on the wavelength of an optical glass is generally characterized by the refractive index $n_d$ at the wavelength 587.56 nm and the Abbe coefficient $$V_d = \frac{n_d - 1}{n_F - n_C}.$$

where $n_F$ is the refractive index at wavelength 486.13 nm and $n_C$ is the refractive index at wavelength 656.27 nm. The partial dispersion in the blue region of the spectrum is given by the expression $$P_{g,F} = \frac{n_g - n_F}{n_F - n_C}.$$

where $n_g$ is the refractive index at wavelength 435.83 nm. The majority of glasses, known as "normal glasses", approximately satisfy the linear relationship $P_{x,y} \approx a_{xy} + b_{xy} \cdot v_d = P_{x,y}$. The straight line passing through the glasses K7 and F2 (Schott "Optical Glass" Catalogue, Schott Glaswerke Mainz, 1980), i.e., the "normal straight line", is given in the blue region of the spectrum by the equation $P_{g,F} = 0.6438 - 0.001682 \cdot v_d$. Glasses which differ from this curve have anomalous partial dispersion. The extent of the deviation is characterized by the ordinate different $\Delta P$, by which the relevant $P/v_d$ point has shifted against the normal straight line (Abbe straigt line). Glasses in which $\Delta P < 0$, are known as glasses of negative anomalous partial dispersion.

The use of glasses of highly anomalous partial dispersion makes it possible to greatly suppress the secondary spectrum in lens systems for image-forming optics and thus to improve the correction of a lens system of this type.

DE-B 15 96 807 discloses lead/aluminum/boron silicate glasses having refractive indices $n_d$ of from 1.57 to 1.76 and Abbe coefficients $v_d$ of from 29 to 48 with anomalous negative partial dispersion in the blue region. However, due to the high $SiO_2$ and $Al_2O_3$ contents, these glasses have a relatively strong devitrification tendency and require quite high melting temperatures during their production.

German Patent 15 96 856 describes boric acid-free lanthanum glasses in which the problem of poor melting properties is solved by replacing all or some of the $SiO_2$ and $Al_2O_3$ by $GeO_2$ or $Ga_2O_2$ and/or $In_2O_3$. However, the advantage of improved melting properties is balanced by the considerable increase in cost of the mixture. Japanese Patent 55, 1481 (B2, 1980) describes glasses having refractive indices $n_d$ of between 1.63 and 1.74, Abbe coefficients $v_d$ of about 32–51 and anomalous negative partial dispersion in the blue region, and containing 5–52% of ZnO and 4–46% of $Sb_2O_3$. As a consequence of the toxicity of $Sb_2O_3$, these glasses require increased safety measures to be taken for protecting the environment and personnel during production, which thus becomes inconvenient and expensive. Japanese Preliminary Published Specification 53/90311 (1978) describes glasses having $n_d$ of about 1.63 to 1.72 and $v_d$ of about 34 to 41 and containing: 3–11% by weight of $SiO_2$, 20–35% by weight of $B_2O_3$, 10–18% by weight of $Al_2O_3$, 40–58% by weight of PbO and 0–5% by weight of each of alkali metal oxides, alkaline earth metal oxides, and $La_2O_3 + ZrO_2 + Nb_2O_5$. The high $Al_2O_3$ content, in particular, causes high melting points and a high devitrification tendency.

SUMMARY OF THE INVENTION

An object of the invention is to provide a composition range for optical glasses of anomalous negative partial dispersion in the blue region in which the refractive index $n_d$ can be varied between 1.73 and 1.83 and the Abbe coefficient $v_d$ between 31 and 38, without losing the negative anomalous partial dispersion $\Delta P_{g,F}$. Which are easy to melt, and which are stable that they can be produced reproducibly and simply, even in large plants.

Upon further study of the specification and appended claims, further objects and advantages of this invention will become apparent to those skilled in the art.

These objects are achieved by providing glass of negative anomalous partial dispersion in the blue region, refractive index $n_d$ of from 1.69 to 1.83 and Abbe coefficient $v_d$ of from 29 to 38.5, consisting essentially of (in % by weight based on oxides):

| | | | | | |
|---|---|---|---|---|---|
| 0–7.5 | $SiO_2 + GeO_2$ | 0–2 | $GeO_2$ | 0–10 | MgO |
| 25–33 | $B_2O_3$ | 0–4.5 | $Li_2O$ | 0–16 | CaO |
| 19–50 | PbO | 0–4.5 | $Na_2O$ | 0–16 | BaO |
| 0–2 | $HfO_2$ | 0–4.5 | $K_2O$ | 0–16 | SrO |
| 1–6 | $ZrO_2$ | 0–4.5 | Σ alkali metal oxides | 0–16 | BaO + SrO |
| 1–6 | $ZrO_2 + HfO_2$ | | | 0–16 | ZnO |
| 4–20 | $Ta_2O_5$ | 0–20 | Σ alkaline earth metal oxides + ZnO | | |
| 0–8.0 | $Al_2O_3$ | 0–<9 | $La_2O_3$ | | |
| 0–4 | $TiO_2$ | 0–5.5 | $Y_2O_3$ | | |
| 0–1 | $WO_3$ | 0–5.5 | $Gd_2O_3$ | | |
| 0–7 | $Nb_2O_5$ | 0–11 | Σ $La_2O_3 + Y_2O_3 + Gd_2O_3$ | | | with the proviso that the Σ $(SiO_2+GeO_2+B_2O_3)/Σ(Ta_2O_5+ZrO_2+HfO_2)$ ratio is $\leq 5$ and the PbO/Σ $(SiO_2+GeO_2+B_2O_3)$ ratio is less than 2.

A preferred glass contains (in % by weight)

| | | | | | |
|---|---|---|---|---|---|
| 0–4 | $SiO_2 + GeO_2$ | 0–2 | $GeO_2$ | 0–10 | MgO |
| 26–33 | $B_2O_3$ | 0–1 | $Li_2O$ | 0–16 | CaO |
| 19–50 | PbO | 0–1 | $Na_2O$ | 0–16 | BaO |
| 1–6 | $ZrO_2$ | 0–1 | $K_2O$ | 0–16 | SrO |
| 4–16 | $Ta_2O_5$ | 0–2 | Σ alkaline earth metal oxides | | |
| 0–6 | $Al_2O_3$ | | | 0–16 | ZnO |
| 0–4 | $TiO_2$ | 1.5–20 | Σ alkaline earth metal oxides + ZnO | | |
| 0–1 | $WO_3$ | 0–11 | $La_2O_3$ | | |
| 0–7 | $Nb_2O_5$ | 0–5.5 | $Y_2O_3$ | | |
| | | 0–5.5 | $Gd_2O_3$ | | |
| | | 4–11 | Σ $La_2O_3 + Y_2O_3 + Gd_2O_3$ | | | has a $\Sigma(SiO_2+GeO_2+B_2O_3)/\Sigma(Ta_2O_5+ZrO_2)$ ratio of less than 5 and a $PbO/\Sigma(SiO_2+GeO_2+B_2O_3)$ ratio of less than 1.7. The glass may furthermore contain conventional refining assistants. These glasses are useful wherever glasses having these properties are desired, e.g., in lens systems of telescopes, cameras, and all other image-forming devices.

The glass system is based on $B_2O_3$, PbO, $ZrO_2$ and $Ta_2O_5$. $SiO_2$ as component is not absolutely essential, but has the advantage of improving the chemical resistance of the glass. However, at an $SiO_2$ content of greater than 4% by weight, the negative anomalous partial dispersion may disappear. The $SiO_2$ component may be replaced by the related $GeO_2$ up to a concentration of 2% by weight without disadvantageous effects on the glass.

The boric acid content is between 26 and 33% by weight. Below this range, the negative partial dispersion may disappear and a $B_2O_3$ content of greater than 33% by weight results in undesirably high Abbe coefficients. Tantalum oxide, in the range described, increases the refractive index and reduces the Abbe coefficient without adversely affecting the glass properties. The PbO content should not be below the range of 19–50% by weight, since the melt would then have unsatisfactory glass-forming properties, and should not exceed this range, since the negative partial dispersion could then disappear.

The negative partial dispersion desired is achieved by means of balanced $PbO:B_2O_3+GeO_2+SiO_2$ ratios on the one hand and $B_2O_3+GeO_2+SiO_2:Ta_2O_5+ZrO_2$ ratios on the other hand. If the $PbO:SiO_2+GeO_2+B_2O_3$ ratio exceeds 1.7, the PbO has a crucial effect on the deviation of the relative partial dispersion towards positive values. Thus, the conventional prior-art glasses with a high lead content, if they are in the claimed $n_d/v_d$ range, generally have a positive anomalous partial dispersion.

The ratio between $B_2O_3+GeO_2+SiO_2$ and $Ta_2O_5+ZrO_2$ is also of crucial importance for adjusting the relative partial dispersions toward negative deviations. If this ratio exceeds 5, the property of negative anomalous partial dispersion is lost. On the other hand, it is not possible to reduce the abovementioned ratio between $B_2O_3+GeO_2+SiO_2$ and $Ta_2O_5+ZrO_2$ to an unlimited extent since this means a continuous increase in the tantalum oxide—or zirconium dioxide—content, which destabilizes the glass as a whole more and more. However, this danger is excluded by the selected limits for the contents of $SiO_2$, $GeO_2$, $B_2O_3$, $Ta_2O_5$ and $ZrO_2$.

As glass converter oxides for varying the $n_d/v_d$ values, the oxides of zinc, lanthanum, titanium, niobium, tungsten and alkaline earth metals are added to the glass in the stated ratios.

BaO in the range according to the invention improves the chemical resistance of the glass. The barium oxide may be fully replaced by calcium oxide, strontium oxide or zinc oxide and up to 10% by weight by magnesium oxide.

Zirconium dioxide in amounts of 1–6% by weight increases the chemical resistance of the glass. However, as the zirconium dioxide content increases, so does the tendency towards crystallisation, which means that a content of 6% by weight should not be exceeded. Addition of titanium dioxide in amounts of up to 4% by weight allows the chemical resistance to be further increased. However, an increase in the titanium dioxide amount is accompanied by an increase in the melting point and the tendency towards crystallization.

In order to improve the melting properties, the glass may also contain up to 2% by weight of alkali metal oxides; however, not more than 1% by weight of each of the individual alkali metal oxides, in particular lithium oxide, sodium oxide and potassium oxide, should be present. A total alkali metal content of greater than 2% should be avoided since it has an adverse effect on the partial dispersion and the chemical resistance of the glass during grinding and polishing and during any subsequent antireflective coating operation.

Lanthanum oxide may be replaced by yttrium oxide or gadolinium oxide, in each case up to a content of 5.5% by weight.

If necessary, the glass may also contain conventional refining assistants, for example $As_2O_3$, $Sb_2O_3$, cerium-(IV) compounds and halogens in the form of their ions, nitrates and sulphates. In general, preference is given to $As_2O_3$, $Sb_2O_3$, cerium(IV) compounds and F and Cl in the form of fluoride and chloride ions. The refining assistants may normally be present in the glass in the conventional amounts of up to 1% by weight and may be introduced through the compounds which are conventional and possible in glass technology (for example as $BaF_2$, $LaF_3$, $BaSiF_6$, NaCl, etc.) without adversely affecting the relative partial dispersion in an undesired manner.

The choice of a borate-containing glass system with a small amount of added $SiO_2$ has the advantage that, due to the relativly low $SiO_2$ content, the glasses can be produced at relatively low melting temperatures, in spite of the contents of tantalum oxide and zirconium dioxide. The melting temperatures play a crucial role in the case of attack by the glass melt on the melting vessel. The reduction in attack on the melting vessel results on the one hand in improved glass quality and on the other hand in a lowering of production costs. At the same time, the reduction of the melting temperatures means that the glasses can be produced using less energy and therefore more economically.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, if any, cited above and below, and of corresponding applications Federal Republic of Germany P 40 01 008.2, filed Jan. 16, 1990 and Federal Republic of German P 40 32 567.9, filed Oct. 13, 1990, are hereby incorporated by reference.

EXAMPLES

The glasses according to the invention are produced as follows:

The raw materials (oxides, carbonates, nitrates, fluorides, etc.) are weighed out and mixed thoroughly. The mixture is melted at about 1050° C. to 1150° C., then refined and thoroughly homogenized. Casting takes place at about 900° C. in a prewarmed casting mold. The compositions and properties of 18 illustrative glasses are shown in the table. The compositions of the glasses are given in % by weight based on oxides.

TABLE 1

|  | 1 | 2 | 3 | 4 | 5 | 6 | 7 |
|---|---|---|---|---|---|---|---|
| $Al_2O_3$ | 5.5 | 2.9 | — | — | — | — | — |
| $SiO_2$ | 3.0 | 4.0 | — | — | 2.5 | — | 2.5 |
| $B_2O_3$ | 26.7 | 30.5 | 30.0 | 28.9 | 27.1 | 29.3 | 31.6 |
| $Na_2O$ | 0.3 | 0.1 | — | — | — | — | — |
| $K_2O$ | 0.8 | 0.4 | — | — | — | — | — |
| MgO | — | — | — | — | — | — | — |
| CaO | 1.9 | 1.0 | — | — | — | — | — |
| BaO | — | 13.5 | — | — | — | — | 12.0 |
| SrO | — | — | — | — | — | — | — |
| ZnO | — | — | 3.0 | 2.9 | 3.0 | 2.9 | 1.5 |
| $La_2O_3$ | 8.6 | 4.4 | 10.0 | 9.7 | 8.1 | 7.9 | 5.2 |
| $Y_2O_3$ | — | — | — | — | — | — | — |
| $Gd_2O_3$ | — | — | — | — | 2.0 | 2.0 | — |
| $TiO_2$ | — | 3.0 | — | — | — | — | 2.0 |
| $WO_3$ | 0.9 | 0.4 | — | — | — | — | — |
| $ZrO_2$ | 1.8 | 5.0 | 2.5 | 2.4 | 2.5 | 2.5 | 5.3 |
| $Ta_2O_5$ | 11.5 | 15.4 | 4.5 | 10.2 | 6.6 | 9.8 | 12.4 |
| $Nb_2O_5$ | — | — | — | — | — | — | 1.6 |
| PbO | 39.0 | 19.4 | 50.0 | 45.9 | 48.2 | 45.6 | 25.9 |
| $\frac{\Sigma (SiO_2 + B_2O_3 + GeO_2)}{\Sigma (Ta_2O_5 + ZrO_2)}$ | 2.23 | 1.69 | 4.29 | 2.29 | 3.25 | 2.38 | 1.92 |
| $PbO/\Sigma(SiO_2 + B_2O_3 + GeO_2)$ | 1.31 | 0.56 | 1.67 | 1.59 | 1.63 | 1.56 | 0.76 |
| nd | 1.7543 | 1.7329 | 1.8147 | 1.8235 | 1.8153 | 1.8150 | 1.7627 |
| vd | 34.13 | 36.00 | 31.96 | 31.69 | 31.85 | 32.05 | 34.55 |
| Pg, F | 0.5832 | 0.5817 | 0.5887 | 0.5882 | 0.5889 | 0.5876 | 0.5837 |
| Δ Pg, F | −0.0032 | −0.0015 | −0.0013 | −0.0023 | −0.0013 | −0.0023 | −0.0020 |

|  | 8 | 9 | 10 | 11 | 12 |
|---|---|---|---|---|---|
| $Al_2O_3$ | — | — | — | — | — |
| $SiO_2$ | 2.5 | 2.5 | 2.5 | 2.5 | 2.6 |
| $B_2O_3$ | 31.6 | 31.6 | 31.2 | 32.1 | 32.2 |
| $Na_2O$ | — | — | — | — | — |
| $K_2O$ | — | — | — | — | — |
| MgO | — | — | — | — | — |
| CaO | — | — | — | — | — |
| BaO | 12.0 | 12.0 | 11.9 | 10.2 | 10.2 |
| SrO | — | — | — | — | — |
| ZnO | 1.5 | 1.5 | 1.5 | 1.5 | 1.5 |
| $La_2O_3$ | 5.0 | 5.0 | 5.0 | — | 5.1 |
| $Y_2O_3$ | — | — | — | 5.1 | — |
| $Gd_2O_3$ | — | — | — | — | — |
| $TiO_2$ | 2.0 | 2.0 | 2.0 | 2.0 | 2.0 |
| $WO_3$ | — | — | — | — | — |
| $ZrO_2$ | 5.3 | 5.3 | 5.3 | 3.4 | 3.4 |
| $Ta_2O_5$ | 12.2 | 12.2 | 10.4 | 14.5 | 14.5 |
| $Nb_2O_5$ | 1.5 | 3.0 | 5.5 | 1.5 | 1.5 |
| PbO | 26.4 | 24.9 | 24.7 | 27.2 | 27.0 |
| $\frac{\Sigma (SiO_2 + B_2O_3 + GeO_2)}{\Sigma (Ta_2O_5 + ZrO_2)}$ | 1.95 | 1.95 | 2.15 | 1.93 | 1.94 |
| $PbO/\Sigma(SiO_2 + B_2O_3 + GeO_2)$ | 0.77 | 0.73 | 0.73 | 0.79 | 0.78 |
| nd | 1.7644 | 1.7661 | 1.7736 | 1.7569 | 1.7602 |
| vd | 34.49 | 34.10 | 33.24 | 34.38 | 34.26 |
| Pg, F | 0.5836 | 0.5849 | 0.5875 | 0.5834 | 0.5845 |
| Δ Pg, F | −0.0022 | −0.0015 | −0.0004 | −0.0026 | −0.0017 |

TABLE 2

|  | 13 | 14 | 15 | 16 | 17 | 18 |
|---|---|---|---|---|---|---|
| $Al_2O_3$ | — | — | 2.9 | 2.9 | 2.9 | 2.9 |
| $SiO_2$ | 2.5 | 2.6 | 4.0 | 4.0 | 4.0 | 4.0 |
| $B_2O_3$ | 30.8 | 31.3 | 30.5 | 30.5 | 30.5 | 30.5 |
| $Na_2O$ | — | — | 0.1 | 0.1 | 0.1 | 0.1 |
| $K_2O$ | — | — | 0.4 | 0.4 | 0.4 | 0.4 |
| MgO | — | — | — | — | 7.0 | — |
| CaO | — | — | 1.0 | 14.5 | 7.5 | 1.0 |
| BaO | 12.1 | 12.3 | — | — | — | — |
| SrO | — | — | 13.5 | — | — | — |
| ZnO | 1.5 | 1.5 | — | — | — | 14.5 |
| $La_2O_3$ | — | — | 4.4 | 4.4 | 4.4 | 4.4 |
| $Y_2O_3$ | — | — | — | — | — | — |
| $Gd_2O_3$ | 5.0 | 5.1 | — | — | — | — |
| $TiO_2$ | 2.0 | 2.1 | 3.0 | 3.0 | 3.0 | 3.0 |

TABLE 2-continued

|  | 13 | 14 | 15 | 16 | 17 | 18 |
|---|---|---|---|---|---|---|
| $WO_3$ | — | — | 0.4 | 0.4 | 0.4 | 0.4 |
| $ZrO_2$ | 5.3 | 5.5 | 5.0 | 5.0 | 5.0 | 5.0 |
| $Ta_2O_5$ | 8.6 | 6.2 | 15.4 | 15.4 | 15.4 | 15.4 |
| $Nb_2O_5$ | 5.5 | 6.2 | — | — | — | — |
| PbO | 26.7 | 27.2 | 19.4 | 19.4 | 19.4 | 19.4 |
| $\frac{\Sigma (SiO_2 + B_2O_3 + GeO_2)}{\Sigma (Ta_2O_5 + ZrO_2)}$ | 2.40 | 2.90 | 1.69 | 1.69 | 1.69 | 1.69 |
| $PbO/\Sigma(SiO_2 + B_2O_3 + GeO_2)$ | 0.80 | 0.80 | 0.56 | 0.56 | 0.56 | 0.56 |
| $n_d$ | 1.7520 | 1.7476 | 1.7379 | 1.7457 | 1.7333 | 1.7478 |
| $v_d$ | 34.50 | 34.62 | 36.34 | 37.18 | 37.40 | 35.68 |
| Pg, F | 0.5845 | 0.5846 | 0.5814 | 0.5794 | 0.5770 | 0.5811 |
| Δ Pg, F | −0.0013 | −0.0010 | −0.0012 | −0.0018 | −0.0040 | −0.0026 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A $B_2O_3/PbO/ZrO_2/Ta_2O_5$ system glass with a negative anomalous partial dispersion in the blue region, a refractive index $n_d$ of from 1.69 to 1.83, an Abbe coefficient $v_d$ of from 29 to 38.5, and which consists essentially of, in % by weight based on oxides:

| 0–4 | $SiO_2 + GeO_2$ | 0–2 | $GeO_2$ | 0–10 | MgO |
|---|---|---|---|---|---|
| 26–33 | $B_2O_3$ | 0–1 | $Li_2O$ | 0–16 | CaO |
| 19–50 | PbO | 0–1 | $Na_2O$ | 0–16 | BaO |
| 1–6 | $ZrO_2$ | 0–1 | $K_2O$ | 0–16 | SrO |
| 4–16 | $Ta_2O_5$ | 0–9.7 | $La_2O_3$ | 0–16 | ZnO |
| 0–6 | $Al_2O_3$ | 0–5.5 | $Gd_2O_3$ | 0–4 | $TiO_2$ |
| 0–5.5 | $Y_2O_3$ | 0–1 | $WO_3$ | 0–7 | $Nb_2O_5$ |
| 0–2 | Σ alkali metal oxides | | | | |
| 1.5–20 | Σ alkaline earth metal oxides + ZnO | | | | |
| 4–11 | $\Sigma La_2O_3 + Y_2O_3 + Gd_2O_3$ | | | | | with the proviso that the $\Sigma(SiO_2+GeO_2+B_2O_3)/\Sigma(Ta_2O_5+ZrO_2+HfO_2)$ ratio is $\leq 5$ and the $PbO/\Sigma(SiO_2+GeO_2+B_2O_3)$ ratio is less than 1.7.

2. A glass according to claim 1, consisting essentially of

| 0–4.0 | $SiO_2$ | 0 | $GeO_2$ |
|---|---|---|---|
| 26.7–32.2 | $B_2O_3$ | 0 | $Li_2O$ |
| 19.4–45.9 | PbO | 0–0.8 | $K_2O$ |
| 1.8–5.3 | ZrO | 0–9.7 | $La_2O_3$ |
| 10.2–15.4 | $Ta_2O_5$ | 0–5.1 | $Y_2O_3$ |
| 4.4–9.7 | $La_2O_3 + Y_2O_3$ | 0–7 | MgO |
| 0–5.5 | $Al_2O_3$ | 0–14.5 | CaO |
| 0–3 | $TiO_2$ | 0–13.5 | BaO |
| 0–0.9 | $WO_3$ | 0–13.5 | SrO |
| 0–5.5 | $Nb_2O_5$ | 0–14.5 | ZnO |
| 0–0.1 | $Na_2O$. | | |

3. A glass according to claim 1, consisting essentially of

| 0–4 | $SiO_2$ | 0 | $GeO_2$ |
|---|---|---|---|
| 30.5–32.2 | $B_2O_3$ | 0 | $Li_2O$ |
| 19.4–26.4 | PbO | 0 | $Gd_2O_3$ |
| 3.4–5.3 | $ZrO_2$ | 0 | $Y_2O_3$ |
| 10.4–15.4 | $Ta_2O_5$ | 0–0.1 | $Na_2O$ |
| 4.4–5.2 | $La_2O_3$ | 0–7 | MgO |
| 0–2.9 | $Al_2O_3$ | 0–14.5 | CaO |
| 2.0–3.0 | $TiO_2$ | 0–13.5 | BaO |
| 0–0.4 | $WO_3$ | 0–14.5 | ZnO |
| 0–5.5 | $Nb_2O_5$. | | |

* * * * *